July 19, 1966 J. W. KISLING III 3,261,934
PRESSURE BALANCED HYDRAULIC TIME-DELAY BOREHOLE SWITCH
Filed Dec. 4, 1963 2 Sheets-Sheet 1
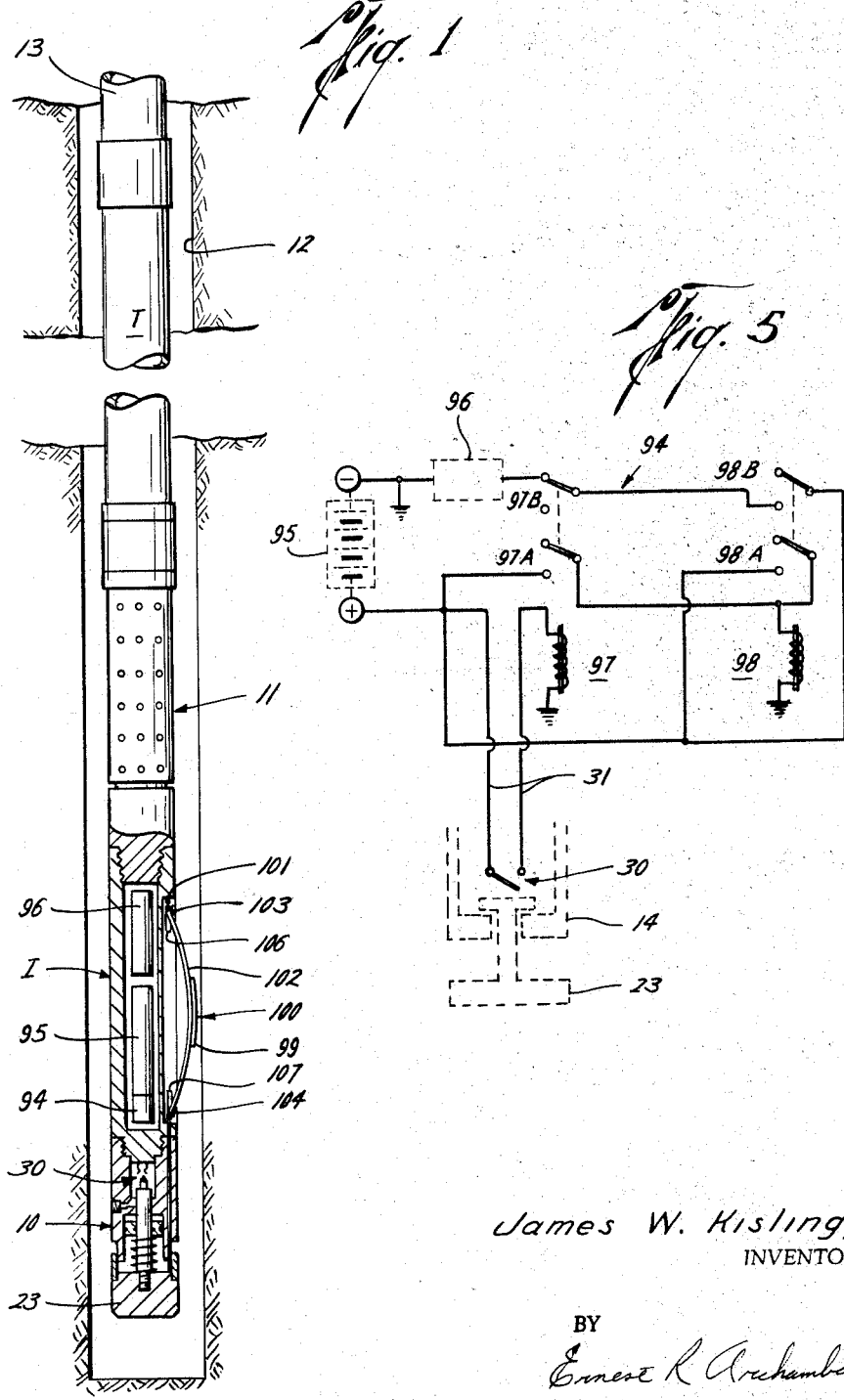
James W. Kisling, III
INVENTOR.
BY
Ernest R. Archambeau Jr.
ATTORNEY

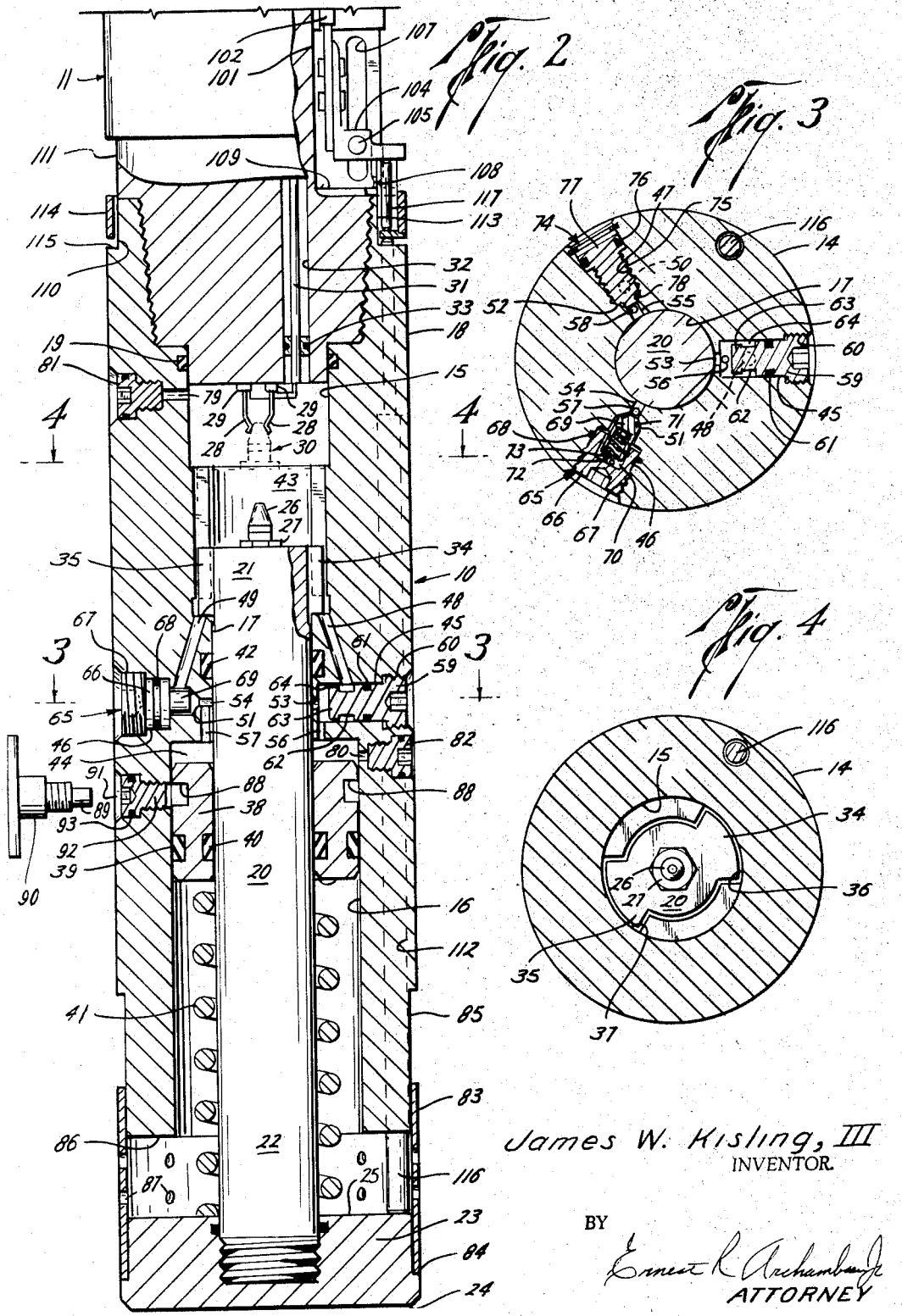

3,261,934
PRESSURE BALANCED HYDRAULIC TIME-DELAY BOREHOLE SWITCH
James W. Kisling III, Houston, Tex., assignor to Schlumberger Well Surveying Corporation, Houston, Tex., a corporation of Texas
Filed Dec. 4, 1963, Ser. No. 327,972
6 Claims. (Cl. 200—34)

This invention relates to an apparatus for use in a borehole and more particularly to a downhole switching assembly for controlling the operation of electrical instruments within a well bore.

It is common practice to pass borehole instruments through a well bore to obtain data relating to the fluid content and geological nature of the subterranean earth formations traversed by the well bore as well as to measure such variables as the bore diameter, vertical inclination or deviation of the well bore.

Borehole instruments are typically suspended and passed through a well bore by use of an armored electrical cable spooled to a winch at the earth's surface. This cable provides an electrical communication path for transmitting power and signals between surface-located equipment and the electrical circuitry within the instrument. With respect to electrical control of such instruments, it has heretofore been necessary to depend upon electrical conductors within such armored cables to provide a control path from the ground surface to the instrument. As the number of downhole electrical components increases, however, it becomes increasingly difficult to transmit a greater number of control or power signals since there is a practical limit to the number of conductors which may be carried within a suspension cable.

It should be appreciated also that where a borehole instrument is suspended from a string of drill pipe, it would not be practical to have conductors leading from the instrument to the surface of the ground.

It is, therefore, an object of the present invention to provide new and improved means for controlling the switching of electrical circuitry carried within borehole instruments independently of surface-located electrical control apparatus.

It is a further object of the invention to provide new and improved downhole electrical switching apparatus for operating electrical circuitry carried in borehole instruments which requires positive actuation and is not subject to being actuated by accidental engagement with obstructions along a borehole.

It is an additional object of the invention to provide new and improved downhole electrical switching apparatus incorporating a time-delay mechanism which ensures that accidental engagement of the borehole instrument with an obstruction along a borehole will not prematurely actuate the electrical circuitry.

These and other objects of the present invention are obtained by apparatus adapted for mounting on a borehole instrument and which includes a downhole switch operable by the physical manipulation of the apparatus within the borehole.

The downhole switch includes a plunger associated with an electrical switch in the apparatus, the plunger and switch being retained in an inoperative position by a resilient biasing means. When an instrument equipped with the downhole switching apparatus reaches the bottom of a well bore or a bridge plug previously set at a predetermined location therein, the instrument is applied to this obstruction so that its weight will gradually impel the plunger into engagement with the switch and a relay circuit will subsequently initiate operation of the electrical circuitry within the instrument whenever the instrument is picked-up to disengage the plunger from the switch. A hydraulic time-delay device is incorporated within the downhole switching apparatus to yieldably retard the travel of the plunger toward engagement with the switch and an electrical relay circuit is provided to prevent initiation of operation until the instrument is picked-up. Thus, as the instrument is being lowered in a well bore, accidental contacts of the instrument with obstructions along the well bore will not depress the plunger sufficiently to actuate the switch prematurely. Actuation of the switch, therefore, will accordingly require that the instrument be applied to the obstruction for a finite period before the switch is closed. The plunger is also pressure balanced to make it responsive only to engagement with the borehole and not responsive to the pressure of borehole fluid.

Additional objects and advantages of the invention become apparent from the following detailed description of representative embodiments thereof, taken in conjunction with the accompanying drawings, in which:

FIG. 1 illustrates a borehole instrument equipped with the downhole switching aparatus and disposed in a well bore;

FIG. 2 shows an embodiment of a downhole switching apparatus employing the principles of the invention;

FIG. 3 is an enlarged cross-section taken along the line 3—3 in FIG. 2;

FIG. 4 is an enlarged cross-section taken along the line 4—4 in FIG. 2; and

FIG. 5 shows a holding circuit for use with the apparatus.

In FIG. 1, a downhole switching apparatus 10 exemplifying the principles of the present invention is shown attached to the lower end of a borehole instrument 11 suspended in a well bore 12 at the end of a string of tubing 13. The instrument 11 may include, for example, a drillstem tester T in combination with an electrical logging instrument I having a pad carrying resistively electrodes in the well-known manner, the electrodes being coupled to recording instruments within a housing.

Referring now to FIG. 2, downhole switching apparatus 10 includes a cylindrically-shaped hollow housing 14 having an upper bore 15 and a lower bore 16, the lower bore 16 being larger than the upper bore 15. Upper and lower bores 15, 16 are connected by a smaller-diametered axial bore 17.

The housing has an upper end 18 above bore 15 which threadingly receives a lower plug end of borehole instrument 11 and sealing ring 19 is provided between the plug end and housing 14 to seal the upper end 18 of the bore 15.

A reciprocable cylindrical plunger member 20 has a central portion slidably received in axial bore 17, an upper enlarged head portion 21 in bore 15 and a lower portion 22 extending through the lower bore 16 to a point below the end of housing 14 where it is attached to an end piece or bore-contacting member 23. End piece 23 has a downwardly-facing surface 24 for engagement with an obstruction in a well bore and an upwardly-facing surface 25 which is longitudinally spaced from the end of housing 14.

A male electrical conductor member 26 mounted on an insulator 27 is attached to the upper end 21 of plunger member 20 in axial alignment with the axis of the plunger member. The male conductor 26 is adapted for insertion between and engagement with two or more spaced, resilient, electrical-contact members 28 dependently attached by insulators 29 to the lower plug end of the borehole instrument 11. Conductor 26 and contact members 28 comprise an electrical switch 30. Conductors 31 connected to contacts 28 enter a conductor passage 32 in the lower plug end of borehole instrument 11 and are sealed into the passage by a conductor sealing plug 33. Thus, it will be understood that whenever plunger member 20 is moved to its uppermost position, as shown by dashed lines in FIG. 2, male conductor 26 will bridge the space between contacts 28 to complete an electrical circuit between conductors 31. It will be appreciated that although it is not essential to axially align the male conductor 26 and the contacts 28, such alignment makes it possible to attach housing 14 to borehole instrument 11 with assurance that the male conductor will engage the contacts irrespective of the finally assembled relative angular relationship of the housing to the borehole instrument. It should be further appreciated that although it is preferred to use this type of foolproof and durable switching arrangement, it would be equally feasible to use a conventional sealed, spring-biased, momentary-contact switch with an actuator arranged to be engaged by the upper end of the plunger when it reaches the upward extent of its travel.

As seen in FIG. 4, head portion 21 has splines forming stop members 34, 35 on opposite sides of the upper end 21 of plunger member 20, the members 34, 35 being arranged to engage the shoulder formed between bores 15 and 17 to limit the downward travel of the plunger. The stop members or splines 34, 35 are disposed in spline grooves 36, 37 on opposite walls of upper bore 15 to prevent rotation of plunger member 20 when bore-contacting member 23 is threaded onto the lower end of the plunger member 20.

In the lower bore 16, an annular piston 38 is provided, being sealingly received in the bore 16 and disposed around plunger 20 by seals 39, 40. A compression spring 41 is engaged between the piston 38 and surface 25 of bore-contacting member 23.

Axial bore 17 of the housing is provided with a sealing member 42 and hence a sealed upper chamber 43 is formed by bore 15 and seals 19, 42 and a sealed lower chamber 44 is formed by bore 16 and seals 39, 40, and 42, the lower chamber having a variable volume since piston 38 can be longitudinally shifted in bore 16.

Upper and lower chambers 43, 44 are connected to one another for fluid communication by means including three transverse enlarged bore portions 45, 46 and 47 (FIG. 3), each extending radially inwardly from the outside of housing 14 and disposed at angularly-spaced intervals around the central portion of the housing 14 between the sealing ring 42 and the lower chamber 44. Separate passages 48, 49 and 50, respectively, extend substantially longitudinally between a midpoint of each enlarged bore portion to the upper chamber 43. Enlarged bore portion 45 has a uniform diameter throughout its length while the enlarged bore portions 46 and 47 are terminated at their inner ends with frusto-conical surfaces or valve seats 51, 52. The terminal ends of bore portions 45–47, respectively, have smaller transverse passages 53, 54 and 55 which may, if desired, continue until they intersect axial bore 17. Separate longitudinally-extending passages 56, 57 and 58, respectively, are provided to communicate the smaller transverse passages 53, 54 and 55 with the lower chamber 44.

A cylindrical orifice spool 59 is threadingly engaged by threads 60 into enlarged bore portion 45 and sealingly received therein by an O-ring 61. An annular groove 62 is formed around the body of the spool substantially opposite the point where longitudinal passage 48 from upper chamber 43 enters enlarged bore portion 45. The inwardly-extending end of orifice spool 59 is diametrically reduced at 63 to form an annulus 64 of predetermined clearance between the spool and the wall of enlarged bore portion 45. Thus, it will be understood that when the upper chamber 43 and the lower chamber 44 are filled with liquid (not shown), whenever bore-contacting member 23 is pressed inwardly, the central portion of plunger member 20 will move inwardly into upper chamber 43 to displace the liquid contained therein. The displaced liquid will flow through passage 48 and into orifice chamber 45, around the annulus 64 formed between inner end 63 and the wall of orifice chamber 45 and on into fluid passages 53, 56 where it is discharged into the lower chamber 44. As this displaced liquid enters the lower chamber 44, floating piston 38 will move downwardly to accommodate the increased volume of liquid displaced into the lower chamber. It will be understood, of course, that the rate of displacement of liquid from one chamber to the other will be dependent upon the amount of restriction offered by orifice spool 59. Thus, routine calculations may be made using standard formulas to design the amount of annular clearance 64 required to impose a particular time delay on the transfer of the displaced liquid. It should be appreciated, however, that although it is preferred to form an annular orifice, any other type of flow restrictor would serve equally as well.

In the second enlarged bore portion 46, a check valve member 65 is received. The body 66 of check valve 65 is threadingly engaged at 67 and sealed at its inner end by an O-ring 68. A valve head 69 is slidably and spatially received in an axial recess 70 in the inner end of body 66. The end of valve head 69 is complementarily-shaped to engage the frusto-conical surface 51 which serves as a valve seat. An O-ring 71 encircling the tip of valve head 69 serves to seal the valve head against the valve seat 51. A spring 72, received in an axial recess 73 in the inner end of valve head 69 biases the valve head 69 away from valve body 66 and into sealing engagement with valve seat 51. Thus, it will be appreciated that check valve 65 will normally be closed to prevent flow of liquid from upper chamber 43 through passages 49, 54 and 57 to lower chamber 44 but will open to allow free flow in the opposite direction from chamber 44 to chamber 43 and effectively bypass orifice spool 59. Although it is preferred to use the particular type of check valve shown and described, it will, of course, be recognized that other types of check valves may be employed.

A valve 74, threadingly engaged by threads 75 and received into the third enlarged bore portion 47, is sealed therein by an O-ring 76 around the body 77. The inner end of the valve body is complementarily-shaped to engage the frusto-conical valve seat 52 and is sealed therewith by an O-ring 78 encircling the frusto-conical tip of the valve body 77. Valve 74 is used to selectively open and close communication between the upper chamber 43 and lower chamber 44 whenever necessary, such as when filling the chambers, and could, of course, be any conventional type of shut-off valve.

It will be appreciated that since the outwardly-facing side of annular piston 38 is in fluid communication with the exterior of housing 14, the piston 38 will be responsive to the well pressures encountered whenever the apparatus 10 is within a well bore. The upper chamber 43 and the lower chamber 44 as well as bore 17 communicating therebetween, are filled through fill passages, such as 79 and 80, with an electrically nonconductive liquid (not shown) and then closed by plugs, such as 81 and 82. All other openings to the upper cavity are sealed as by conductor sealing plug 33. It will be understood, therefore, that when the switching assembly 10 is being used within a well bore, the well bore pressure will be transmitted from the well fluids beneath the annular piston 38 through the piston to the nonconductive liquid in the sealed chambers 43, 44 above the piston 38. This transmitted pressure acting on the inner end of the plunger member 20 will, accordingly, balance the pressure forces acting on the outer end of the plunger. Thus, it will be appreciated that compression spring 41 will not be required to counteract the pressure forces acting on the bore-contacting member; and to operate the switch 30, only the force of the spring need be overcome.

The bore-contacting member 23 is preferably guided relative to housing 14 by a skirt portion 83 which encircles the bore-contacting member and is engaged against an upwardly-facing peripheral shoulder 84 on the member.

The skirt 83 closely fits over a reduced diameter portion 85 at the lower end of housing 14. As bore-contacting member 23 moves plunger 20 upwardly, the skirt 83 will slide over portion 85 of the housing to axially guide the plunger 20. Upward travel of plunger 20 is stopped whenever upwardly-facing shoulder 25 of bore-contacting member 23 engages lower face 86 of housing 14.

A plurality of ports 87 are staggered around the periphery of skirt 83 to provide fluid communication between the fluids in the well bore 12 exterior of housing 14 and the outer face of annular piston 38. Thus, it will be appreciated that the pressure of fluid within chambers 43 and 44 is balanced relative to the borehole pressure so that the spring 41 can be easily compressed.

As previously mentioned, for a particular electrically nonconductive liquid, the annular clearance 64 around orifice spool 59 is calculated so as to require a given weight to fully compress plunger 20 in a desired time interval. The particular requirements of the instrument will determine the selection of the spring 41 to be used as well as the time interval to be chosen. In one service, for example, annular clearance 64 was designed so that application of a force of 20,000-lbs. (the approximate weight of the drill string and that particular instrument) would require one minute before plunger 20 traveled its full stroke and closed switch 30. It is to be understood that these particular factors are for the purpose of illustration only and that they may be varied over wide limits depending upon the exigencies of the particular instrument.

It is preferable to provide a peripheral groove 88 around the floating piston 38 which is adapted to receive a shank 89 of a tool 90 for holding the piston in place during assembly of apparatus 10. Tool 90 is threaded into an opening 91 in the side of housing 14 and this opening is normally closed by a plug 92 and sealed with an O-ring 93 encircling the plug.

It will be appreciated that switch 30 will be closed only so long as bore-contact member 23 is engaged against the bottom of the well bore or an obstruction in the borehole and that whenever the borehole instrument 11 is picked-up, the switch 30 will be opened. In order to maintain power to the circuitry in the borehole instrument 11, a holding circuit as illustrated in FIG. 5 is provided. As seen in FIG. 5, relay assembly 94 will maintain power from batteries 95 to the circuitry 96, all of which is contained within instrument 11, after switch 30 has been opened by disengaging bore-contact member 23. The relay assembly includes a starting relay 97 and a holding relay 98, both of which are conventional double-pole double-throw relays. Conductors 31 from switch 30 connect the coil of relay 97 with the power supply 95 (carried within the instrument) whenever switch 30 is closed to energize relay 97. Relay switch 97A closes and completes the path between the power supply 95 and the coil of relay 98, which energizes the relay. Relay switch 98A is thereby closed to complete another path from the power supply 95 to the coil of relay 98. Relay switch 98B is also closed at the same time which would complete a path from the power supply to electrical circuitry 96 if it were not for the fact that relay switch 97B is now opened. It will be appreciated, therefore, that as soon as relay switch 97B is closed by opening switch 30 and subsequently de-energizing relay 97, a complete path will be made from power supply 95 through relay 98B and relay switch 97B to electrical circuitry 96.

Many well instruments require an external sensing element which is arranged to contact the wall of a borehole as the instrument is being used. For example, as illustrated in FIG. 1, a formation-resistivity logging instrument will often include an insulated pad member 99 in which spaced electrodes (not shown) are embedded. This pad member is pressed against the face of the borehole 12 to engage the electrodes with the surface of the well bore. Such external elements are customarily mounted on one or more extendible arms or members which preferably are held in a retracted position against the side of the instrument housing to minimize the possibility that the arms would catch on obstructions as the instrument is lowered into a well bore. Where such extendible arms are required, it is prefered, therefore, to utilize an arrangement for releasing the pad.

Referring now to FIGS. 1 and 2, pad member 99 is attached to a movable arm assembly 100 which is movably mounted on one side of instrument 11 and arranged so that it may be held in a retracted position within a longitudinally-extending recess 101 and selectively released therefrom to permit it to assume its expanded position as shown. An outwardly-bowed spring 102 is positioned lengthwise of the instrument 11 with the longitudinal axis of spring 102 being parallel to the longitudinal axis of the borehole instrument. Each end of the spring 102 is affixed to a hinge member 103, 104, each of which has a pin member, such as 105, extending transversely to the longitudinal axis of the spring. These pins are slidably mounted in pairs of longitudinal slots 106, 107 cut in the opposing faces of recess 101 at each end of the recess. Thus, when released, bowed spring 102 is free to move longitudinally with respect to borehole instrument 11.

The arm assembly 100 is preferably maintained in an extended position as the assembled tool is being lowered into a well bore. The bowed spring 102 is held in its extended position by a frangible member, such as a shear pin or screw 108, connecting lower hinge member 104 to the lower face 109 of housing recess 101.

At the upper end of housing 14, a reduced diameter portion is provided at 110. A corresponding reduced diameter portion 111 is provided around the lower plug end of borehole instrument 11. A first longitudinally-extending bore 112 is provided along one side of housing 14 and extends from the lower face 86 of housing 14 to the upwardly-directed face of reduced diameter portion 110 at the upper end of apparatus housing 14. A second longitudinally-extending bore 113 is similarly provided along the lower plug end of borehole instrument 11. This latter longitudinal bore 113 extends from the upper face of reduced diameter portion 111 to the lower face 109 of housing recess 101 at a point directly under lower hinge member 104.

An annular collar 114 is slidably mounted around the upper end 18 of apparatus housing 14 and arranged for reciprocal travel within the peripheral groove 115 formed by reduced diameter portions 110, 111. A first thrust rod member 116 is received in longitudinal bore 112 and arranged so that its lower end rests on upper face 25 of bore-contacting member 23 and its upper end is engaged with the lower side of collar 114. A second thrust rod 117 is received within longitudinal bore 113 and so arranged that its lower end rests on the upper side of collar 114 and its upper end lightly contacts the under side of lower hinge 104. Thus, it will be appreciated that whenever bore-contacting member 23 is moved upwardly, thrust rod 116 will be forced upwardly against collar 114 to move the collar upwardly and force thrust rod 117 against lower hinge member 104 to break shear pin 108. It will be realized that appreciable misalignments of the longitudinal bores relative to each other and the thrust rods therein accordingly will not affect the smooth operation of the releasing mechanism. It will be understood, of course, that a single thrust rod extending from upper face 25 of bore-contacting member 23 to the underside of lower hinge member 104 would serve equally well so long as longitudinal bore 112 was substantially aligned with longitudinal bore 113.

Although the instrument 11 has been described as being suspended from a drill string, it will be realized that the apparatus 10 could also be used just as well in conjunction with a borehole instrument dependently coupled to and suspended from an electrical logging cable. Also, it would be within the spirit and scope of the present invention to make the upper end of housing 14 integral with the instrument housing. Other obvious modifications are equally apparent.

With respect to spring 41, it will be appreciated that it serves a dual function. First of all, spring 41 biases the plunger or piston 20 outwardly. Spring 41 also acts to bias annular piston 38 inwardly as liquid returns to the upper chamber 43 so that a vacuum will not be pulled in lower chamber 44 by the discharge of liquid therefrom as well as providing a yieldable force which will ensure that the total volume in chambers 43 and 44 will remain constant as liquid is transferred from one chamber to the other. It will be recognized that separate springs could be used to bias members 20 and 38 individually, but it is preferred to use the single spring.

Thus, in normal operations as a borehole instrument 11 equipped with switching assembly 10 is lowered into a borehole 12, accidental contacts of bore-contacting member 23 with obstructions along the well bore will merely depress plunger member 20 a very slight distance, if any at all, since such accidental contacts will not be sufficiently long that fluid will have time to be displaced from the upper chamber 43 through orifice spool 59 and on into the lower chamber 44. Upon reaching a bridge plug previously set at a predetermined location or upon reaching the bottom of the borehole 12, the borehole instrument 11 will be applied thereon. This weight will tend to force plunger member 20 upwardly at a rate governed by the sizing of annular clearance 64 around the inner end of orifice spool 59. When plunger 20 has reached its upper limit of travel (when surface 25 engages surface 86 of housing 14), switch 30 will be closed and initiate operation of holding circuit 94 and release the extendible arm assembly 100 (if included). Then, whenever the instrument 11 is picked-up, the spring 41 will push piston 38 inward to its normal position which decreases the volume in chamber 44 to force liquid within the lower chamber 44 rapidly back into upper chamber 43 through the check valve 65 and its related passages. As soon as switch 30 is opened, holding circuit 94 will complete the electrical path from the power supply 95 to the electrical circuitry 96.

Accordingly, it is apparent that the apparatus provides a new and improved means for controlling the switching of electrically-operated borehole instruments which not only eliminates the need for a control path from the ground surface but requires positive actuation and is, accordingly, not subject to premature actuation by accidental contacts with bore hole obstructions.

The novel features of the present invention are set forth with particularity in the appended claims. The present invention, both as to its organization and manner of operation together with further objects and advantages thereof, may best be understood by way of illustration and example of certain embodiments when taken in conjunction with the accompanying drawings in which:

What is claimed is:

1. A downhole switching assembly for borehole instruments comprising: a housing adapted for dependent coupling to a borehole instrument, said housing having a chamber receiving a fluid; means for displacing said fluid from said chamber including a piston member slidably mounted in said chamber for travel therein between spaced positions relative to said housing; means external of said housing and engageable with an obstruction in a borehole for moving said piston member from one of said positions to the other of said positions to displace said fluid; flow-restriction means regulating the displacement of fluid out of said chamber for retarding the travel of said piston member; selectively-operable electrical switch means on said housing; means responsive to travel of said piston member for operating said switch means; and means transmitting pressure external of said housing into said chamber for pressure-balancing said piston member.

2. A downhole switching assembly for borehole instruments comprising: a housing adapted for dependent coupling to a borehole instrument, said housing having a chamber receiving a fluid; means for displacing said fluid including a piston member slidably mounted in said chamber for travel therein between spaced positions relative to said housing and having a portion extending from said housing arranged for engagement with an obstruction in a borehole for moving said piston member from one of said positions to the other of said positions to displace said fluid; flow-restriction means regulating the displacement of fluid out of said chamber for retarding the travel of said piston member between said positions; resilient biasing means for normally urging said piston member toward said one position; stop means for stopping said piston member at said one position; selectively-operable electrical switch means on said housing; means on said piston member for operating said switch means whenever said piston member reaches said other position; and means transmitting pressure external of said housing into said chamber for pressure-balancing said piston member.

3. A downhole switching assembly for borehole instruments comprising: a housing having a first chamber adapted to contain a fluid therein, said housing being adapted for dependent coupling to a borehole instrument; means for decreasing the volume of said first chamber to discharge fluid therefrom including a first piston slidably mounted in said housing in said first chamber, said first piston being arranged for travel between first and second longitudinally-spaced positions relative to said housing, said first piston having an intermediate portion extending out of said first chamber and an end portion extending out of said housing for engagement with an obstruction in a borehole to force said first piston into said first chamber from said first position toward said second position; a second piston slidably mounted around said first piston and in said housing, one side of said second piston forming a second chamber between said first piston and said housing adapted to receive fluid discharged from said first chamber, said housing having a fluid passage therethrough providing access for well fluids to the other side of said second piston; flow-restriction means connecting said first and second chambers regulating the discharge of said fluid out of said first chamber and into said second chamber for retarding the travel of said first piston from said first position toward said second position; resilient biasing means normally urging said first piston toward said first position and urging said second piston in a direction tending to decrease the volume of said second chamber, said second piston moving in response to fluid pressure to expand the volume of said second chamber as said first piston displaces fluid through said flow-restriction means into said second chamber; and electrical switch means responsive to travel of said first piston to said second position, said switch means being adapted for electrical connection to an electrical circuit for controlling the operation of such electrical circuit.

4. The combination of a well bore instrument; electrical circuit means in said instrument; an actuating member movably connected to said instrument and engageable with an obstruction in a wellbore for travel relative to said instrument between two positions; electrical switch means carried by said instrument for selectively controlling said circuit means, said switch means being spatially disposed relative to said actuating member and actuatable in response to travel thereof to one of said positions; and hydraulic means carried by said instrument for delaying the travel of said actuating member toward said one position.

5. The combination of a well bore instrument; electrical circuit means in said instrument; an actuating member movably connected to said instrument and engageable with an obstruction in a well bore for travel relative to said instrument between two positions; electrical switch means carried by said instrument for selectively controlling said circuit means, said switch means being spatially disposed relative to said actuating member and actuatable in response to travel thereof to one of said positions; and hydraulic means carried by said instrument for delaying the travel of said actuating member toward said one position, said hydraulic means including selectively-operable valve means for permitting undelayed travel of said actuating member toward the other of said positions.

6. The combination of a well bore instrument; electrical circuit means in said instrument; arm means movably connected to the combination with said instrument; an actuating member engageable with an obstruction in a well bore movably connected to said instrument and arranged for travel between two positions; electrical switch means carried by said instrument for selectively controlling said circuit means, said switch means being spatially disposed relative to said actuating member and actuatable in response to travel thereof to one of said positions; hydraulic means carried by said instrument for delaying the travel of said actuating member toward said one position; means for releasably holding said arm means in a retracted position against said instrument; and means responsive to travel of said actuating member toward said one position for releasing said holding means to free said arm means from said retracted position.

References Cited by the Examiner

UNITED STATES PATENTS

| | | |
|---|---|---|
| 969,940 | 9/1910 | Conrader. |
| 2,320,863 | 6/1943 | Green _____ 200—61.42 X |
| 2,584,028 | 1/1952 | Kendrick _____ 200—152 X |
| 2,637,788 | 5/1953 | Bracken _____ 200—34 |
| 2,854,758 | 10/1958 | Owen _____ 33—178 |
| 2,953,659 | 9/1960 | Edwards _____ 200—34 X |

FOREIGN PATENTS 560,200 10/1944 Great Britain.

BERNARD A. GILHEANY, *Primary Examiner.*

H. M. FLECK, *Assistant Examiner.*